United States Patent [19]

Waltz et al.

[11] 4,009,452
[45] Feb. 22, 1977

[54] SUBMERSIBLE POWER PACKAGE

[75] Inventors: Allen R. Waltz, San Diego; Howard B. McCracken, Poway, both of Calif.

[73] Assignee: The United States of America as represented by the Secretary of the Navy, Washington, D.C.

[22] Filed: Jan. 12, 1976

[21] Appl. No.: 648,615

[52] U.S. Cl. .............................. 331/68; 114/16 G; 331/113 A
[51] Int. Cl.² .......................................... H03K 3/16
[58] Field of Search ......... 331/68, 113 A; 61/69 R; 114/16 R, 16 G

[56] References Cited
UNITED STATES PATENTS

| | | | |
|---|---|---|---|
| 3,381,485 | 5/1968 | Crooks et al. | 61/69 R |
| 3,411,108 | 11/1968 | Phillips | 331/113 A |
| 3,663,944 | 5/1972 | Low et al. | 331/113 A X |

*Primary Examiner*—Siegfried H. Grimm
*Attorney, Agent, or Firm*—Richard S. Sciascia; Ervin F. Johnston; William T. Skeer

[57] ABSTRACT

A submarine power package converts direct current electrical energy to alternating current energy and is adapted to function while exposed to the high pressures of the deep ocean. A diode protection circuit and special semiconductor mounting arrangement makes this performance possible without the use of a pressure housing.

12 Claims, 6 Drawing Figures

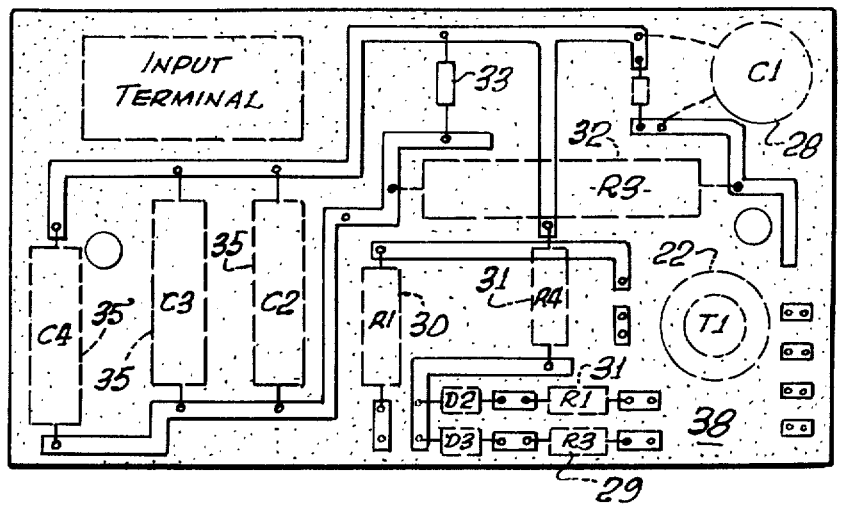
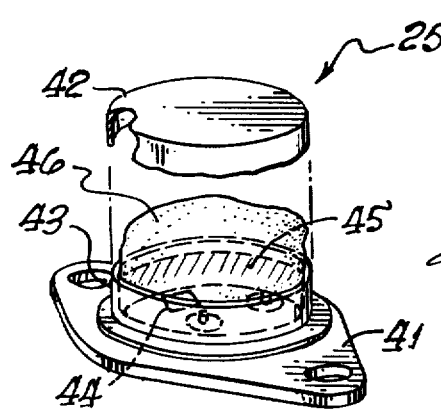
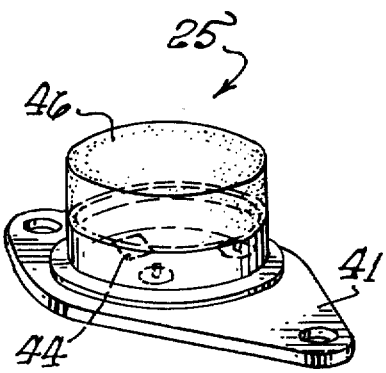

SUBMERSIBLE POWER PACKAGE

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to the fields of oceanography and electronic engineering. In particular, this invention relates to an electronic power converter especially adapted for use on deep ocean submersible vehicles. In still greater particularity, the invention relates to a circuit to convert direct current electrical energy to alternating current energy. By way of further characterization, this invention relates to a power conversion circuit which requires no pressure isolation housing. More specifically, but without limitation thereto, this invention relates to a power converter circuit which changes the direct current of an oceanographic submersible to alternating current while exposed to the operating pressures of the pelagic depths.

DESCRIPTION OF THE PRIOR ART

The role of submarine vehicles, particularly the oceanographic submersibles, have played increasingly important roles in man's exploration of the oceans. The design and utilization of these vehicles have given rise to a problem of power utilization and conversion. That is, the use of electrical energy beneath the surface of the ocean have required special design and fabrication techniques. These problems of utilizing electrical power have, in many instances, been the primary design consideration. As a result, oceanographic submersibles may be roughly classified into two primary categories. Those which depend upon an umbilical connection to the surface such as that shown in U.S. Pat. No. 3,880,103 granted to Howard R. Talkington on Apr. 29, 1975 for "Tethered Mine Hunting System", and the unconnected remotely controlled or manned vehicles such as illustrated in U.S. Pat. No. 3,702,597 issued to William T. Odum on Nov. 14, 1972 for "Salvage Work Vehicle". In the former or tethered vehicle, electrical power is transmitted to the vehicle by means of the surface connector umbilical. In the latter or free type vehicle, electrical power is commonly supplied by on-board power sources which, generally, are comprised of banks of special batteries.

Although quite satisfactory for limited times, battery power sources supply only direct current electrical energy. Thus, electrical equipment used in conjunction with this type of submersible must be adapted for utilization of this type of energy or, a conversion device to convert the direct current electrical energy to alternating current electrical energy must be provided. The former choice of utilizing direct current type equipment limits the type of equipment which may be used and increases the design and procurement cost of such equipment.

Because most equipment which utilizes alternating current electrical energy may be successfully adapted to underwater environmental conditions, the conversion alternative offers many financial and technical advantages. However, in the past, such an alternative required providing a pressure impervious housing for the electrical conversion equipment. Pressure housings having the strength necessary to withstand deep ocean pressures are necessarily quite heavy and expensive. As a result, the location of power conversion equipment is frequently made in the inhabited area of the submersible vehicle. As is well understood, because of the expense and structural design and characteristics, the inhabited portions of deep ocean submersibles are quite limited in volume and space therein is at a premium.

Accordingly, it has been a long felt need in the oceanographic arts for a power conversion apparatus which is impervious to the deep ocean pressures and, consequently, need not require a valuable space within the submersible vehicle or, alternatively, require housing in a separate pressure resistant housing. Such a separate housing configuration is illustrated in U.S. Pat. No. 3,381,485 granted on May 7, 1968 to R. K. Crooks et al. for "General Purpose Underwater Manipulating System".

SUMMARY OF THE INVENTION

The invention provides a submarine power package for conversion of primary dc battery voltage to alternating current which does not require a pressure housing. This conversion circuit employs a lightweight, sheet metal enclosure adapted to transmit the fluid pressures to an insulating oil therein and then to the circuit. The circuit employs a diode protection arrangement in combination with specially modified transistors to result in a conversion system which may withstand the very high pressures encountered in undersea environments.

STATEMENT OF THE OBJECTS OF INVENTION

It is a primary object of this invention to provide an improved power package.

Another object of this invention is to provide the power conversion unit for deep ocean applications.

A further object of this invention is to provide a power conversion unit for use on oceanographic submersibles.

A further object of this invention is to provide a direct current to alternating current converter for high pressure environments.

Yet another object of this invention is to provide a solid state direct current to alternating current converter.

Still another object of this invention is to provide an improved oceanographic power package employing pressure resistant semiconductors.

A still further object of this invention is to provide a power source of alternating current capable of withstanding high ambient pressures of deep ocean operation.

These and other objects of the invention will become more readily apparent from the ensuing specification when taken together with the drawings.

BRIEF DESCRIPTION OF THE DRAWINGS

FIG. 4 is a circuit board layout of a circuit board illustrated in FIG. 3;

FIG. 5 is a perspective view of a partially completed semiconductor as especially modified for use in this invention; and FIG. 6 is a perspective view of a completed semiconductor shown in FIG. 5.

DESCRIPTION OF THE PREFERRED EMBODIMENTS

Figure 1:
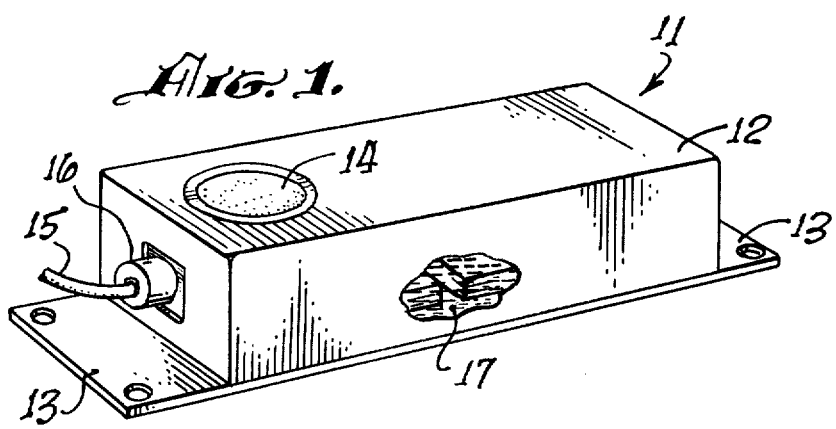
FIG. 1 is a perspective view of the power package of the invention.

Referring to FIG. 1, a perspective view of the completed power package according to the invention shows a unitary assembly 11 as might be mounted on the portion of a submersible vehicle exposed to high pressure ocean environments. As shown, a base mounting flange 13 provides space for mounting hardware to attach power package 11 to the oceanographic submersible. A box-like enclosure 12 extends upwardly from base 13 and has on the upper surface thereof a diaphram 14. Diaphram 14 may be an especially constructed area of the case 12 which has a greater flexibility than the surrounding structure or, conversely, diaphragm 14 may include a flexible plastic material carefully bonded to enclosure 12 with a water-tight joint.

It should be noted that enclosure 12, together with base 13 may be made of a relatively thin gauge of sheet metal or other plastic material. Depending upon the size of material used, enclosure 12 may be sufficiently compliant to the ambient pressure exerted by the ocean environment that diaphragm 14 may be unnecessary. An electrical conductor 15 provides electrical communication from the interior of enclosure 12 to other associated electronic circuits and power utilization devices carried on the submersible vehicle by means of a conventional oceanographic electrical connector 16.

Enclosure 12 together with base 13 provide a fluid type enclosure which houses the individual circuit modules comprising the invention. The voids within this enclosure, not occupied by the modules themselves, is filled with an insulating fluid, such as insulating oil, for example. As is disclosed in the Odum et al. patent, above cited, the use of such insulating oils is conventional in the oceanographic vehicle art for housing electrical hardware.

Figure 2:
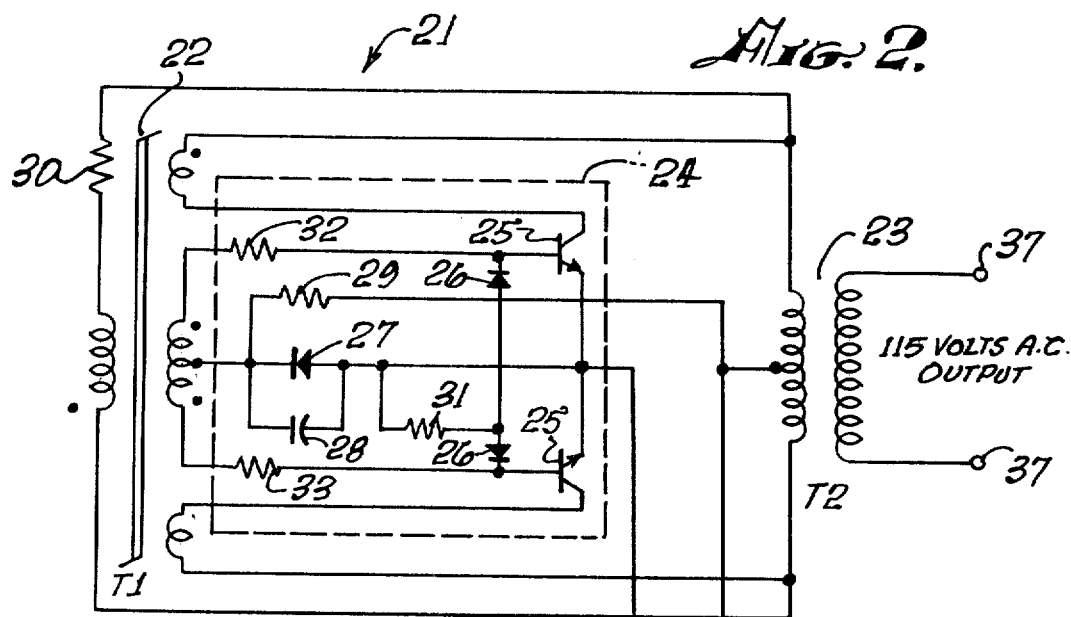
FIG. 2 is a schematic representation of the circuit used in the power package of FIG. 1.

Referring to FIG. 2, the circuit for an individual direct current to alternating current converter is illustrated at 21. A feedback inductor 22 and an output transformer 23 are employed by a circuit 24 to convert the direct current electrical energy supplied by an appropriate battery bank, not shown, to alternating current. Circuit 24 employs two semiconductors 25 which are especially modified in a fashion to be more completely described in an oscillator circuit to convert the dc potential to an alternating waveform.

Of course, such inductively coupled oscillators are well known electronic circuits and the operation thereof may be considered fairly conventional except as noted herein. It has been observed, that the turn-on and turn-off of the condition of the semiconductor active elements is accompanied by switching transients which are characteristic of the inner electrode capacitances, the physical parameters of the inductor used to provide the inductive feedback to sustain oscillation including winding capacitance, and leakage inductances. In terrestrial applications, such switching transients present no problem since they may be easily compensated for by conventional wiring and assemblying techniques. However, when these inductive feedback devices are subjected to the extremely high pressure of deep ocean operation, minute changes occur within their physical dimensions such that their magnetic characteristics are altered in such a fashion that transients, present at normal atmospheric pressures, may be increased in magnitude to attain destructive levels.

In the circuit of the invention, these transients are effectively neutralized by the use of diodes 26 and 27 to establish a reference voltage level on the bases of semiconductors 25 and to provide an auxiliary conduction path for these transients not utilizing the semiconductor devices. In this fashion, transients occasioned by the alternative turn-on and turn-off of semiconductor active are effectively overcome such as to prevent damage to the semiconductor active elements 25. Resistors 31, 32 and 33 complete this diode conduction path. A small value capacitor 28 is used to bridge diode 27 in order to protect diode 27 from extremely short duration pulses.

Other circuit components used in oscillator 30 provide conventional power coupling and signal transfer therein. For example, resistor 30 connected between output transformer 23 and feedback inductor 22 completes a feedback circuit from the output to the input as is conventional in this type of oscillator. Similarly, capacitor 35 and resistor 34 serve as a load stabilization filter as conventional in dc supply circuits. Input terminals 36 provide connection to the circuit for the battery power supply which, as illustrated, provides 60 volts of nominal dc energy to the power package. Output terminals 37 receive the output from output transformer 23 and provide connecting points to the utilization load which may be taken out of power package 11 by means of conductor 15 as shown in FIG. 1.

Figure 3:
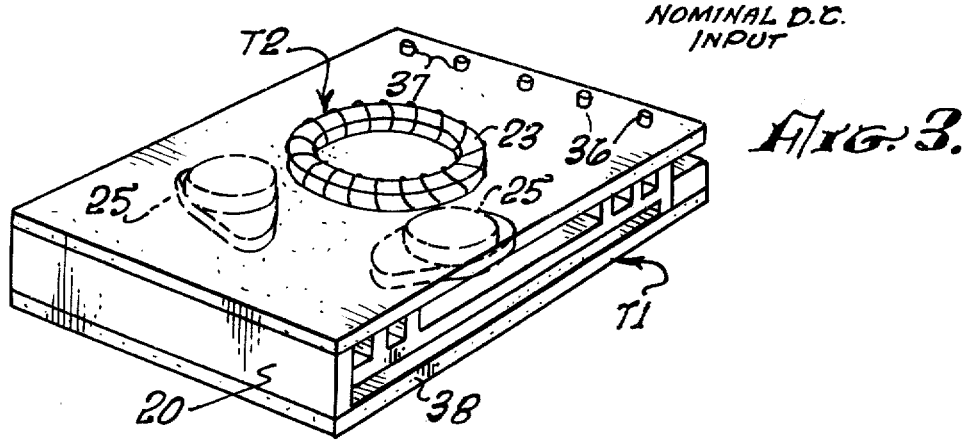
FIG. 3 is a perspective view of the circuit module illustrated in FIG. 2.

Referring to FIG. 3, the individual module supplying the conversions of power is illustrated. As shown, a heat sink 20, which is a conventional piece of electronic hardware, provides a mounting surface for semiconductors 25. A circuit board 38 is mounted on the lower side of heat sink 20 and provides mounting support for the remaining elements used in circuit 24 and the feedback conductor 22 as will be discussed herein. A similar panel carried on the upper surface provides mounting for output transformer 23 which, as illustrated, may preferably be of the toroid type. Thus, it may be seen that the major heat dissipating elements, semiconductors 25 and output transformer 23 have maximum access to the cooling oil 17 contained within enclosure 12 as illustrated in FIG. 1.

Referring to FIG. 4, a layout for the circuit board 38 is illustrated. As shown, circuit board 38 provides mounting space for the inductor 22 used to provide the inductive feedback to sustain oscillations of semiconductors 25 as well as a power input filter discussed in connection with FIG. 2. As shown, the power filter capacitor 35 may conveniently be separated into three capacitors connected in parallel. In this fashion, the bulk required by a capacitor having the desired characteristics to provide adequate filtration may be selected to match the physical dimensions of other components such that enclosure 12 may be of modest dimensions. Otherwise the layout of parts on circuit board 38 follows conventional electronic layout practice in which a maximum exposure to the cooling oil is provided for elements which, because of their electrical circuit position, dissipate electrical energy as heat. Also, the layout arrangement illustrated permits a minimum of conductive strips to be employed such that interelectrode capacitances are reduced.

Referring to FIG. 5, the preparation of the especially modified semiconductors will be described. As illustrated, a semiconductor power transistor 25 has the metal enclosure thereof cut away to reveal the semiconductor chip 44 mounted on the bae 41 thereof. The severed portion 42 is discarded and the remaining portion 43 together with base 41 provides a cup-like vessel to receive a flexible plastic potting material 45 which is carefully decanted therein.

The flexible plastic potting material 45 may be any conventional electronic potting plastic material, however, the silicone rubber type of such compounds have proven particularly desirable in this application.

Referring to FIG. 6, it may be seen that additional plastic housing 46 is cast insitu above potting compound 45 to provide a semirigid enclosure for a semiconductor chip 44 conventionally mounted on base 41.

For purposes of simplicity, the other electrode connections comprising the internal elements of semiconductor 25 are not illustrated and, since they are conventional, are unnecessary for the understanding of the invention.

This plastic-for-metal modification of the conventional state-of-the-art semiconductors has been found to be highly advantageous in this deep ocean circuit and, together with the aforedescribed diode protection circuit, permit direct exposure of the power package to the ambient pressures of the deep ocean environment. Thus, minute fluctures of cap 46 are transmitted to the relatively incompressible potting mixture 45 and thence, through hydraulic distribution, to the base member 41. This transmission and distribution has been found to leave the physical construction of the operative portions of the semiconductors 25 undisturbed such that their operation is unchanged by the high pressure environment.

Of course, the improved construction permits the simplified mounting arrangement illustrated in FIG. 1 and overcomes a continuing problem in the oceanographic arts of power supply permitting the use of ac components in the deep ocean environment with only a direct current power source.

MODE OF OPERATION

The operation of the power package of the invention is primarily the operation of the electronic circuit. As shown in FIG. 2, semiconductors 25 are connected through an output transformer 23 and a feedback inductor 22 to provide an inductively coupled oscillating circuit. Typically, such circuits are difficult to commence oscillation when power is applied and, to overcome this reluctance to start, feedback inductor 22 has a plurality of small secondary windings each in the collectors circuit of semiconductors 25. Of course, some small amount of power is dissipated in this winding but the tradeoff for power efficiency versus reliability in starting is believed to be advantageously solved by the inclusion of the windings.

As will be well understood, the conduction of each of the semiconductors 25 causes the remaining semiconductor to stop conducting with the result that an alternating waveform is produced in the secondary of output transformer 23.

During the periods of nonconduction, a voltage spike is developed by the feedback inductor which, if uncorrected, could damage semiconductors 25. This transient spike is reduced in value by virtue of the conduction path afforded by the diodes and resistance network illustrated. Thus, assuming the upper semiconductor 25 has been turned off by the conduction of the lower semiconductor its base would normally be exposed to this transient pulse. However, a bypass is provided by diode 27, resistor 31, diode 26 and resistor 32. In this fashion, the two diodes and resistor 31 drop the voltage as a series voltage dividing impedance in series with resistance 32. Similarly, if the upper semiconductor 25 is conducting, a voltage divider is provided for the lower semiconductor by diode 27, resistor 31, diode 26 and resistor 33. Since the voltage drops of the diodes are readily available from semiconductor handbooks, the value of resistance 31 and 32 and 33 may be readily calculated to provide the necessary voltage division to assure that the bases of semiconductors 25 are not damaged by a voltage peak in excess of their ability to withstand reverse voltages. In operative examples of the invention which employ 1N914 diodes, resistor 31 is three-and-three-tenths ohms while resistors 32 and 33 are each one ohm.

Similarly, the specially modified power transistors used for semiconductors 25 function electrically as conventional semiconductors and provide successful operation where their metal encased counterparts fail by virtue of the fact that the high pressure environment merely compresses the plastic cap and potting compound without causing physical trauma to the elements encased thereby.

The foregoing description taken together with the appended claims constitute a disclosure such as to enable a person skilled in the electronics and oceanographic arts having the benefit of the teachings contained therein to make and use the invention. Further, the structure herein described meets the aforestated objects of invention, and generally constitutes a meritorious advance in the art unobvious to such an artisan not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A submarine power package for converting direct current electrical energy to alternating current electrical energy while being subjected to the intense pressure of deep ocean environments comprising:

a container;

circuit means effectively mounted within said container to be protected thereby and for converting electrical energy from direct to alternating current and including, an inductively coupled solid state oscillator circuit employing pressure resistant semiconductor active elements therein for producing an alternating current output therefrom, a coupling inductor connected to said semiconductor active elements:

a diode protection circuit preventing damage to said semiconductor active elements caused by inductor-coupled transient spike signals; and an output transformer connected to said inductively coupled oscillator to transform the alternating current output therefrom to a desired voltage level for effective utilization thereof;

a flexible diaphragm effectively mounted in one surface of said container for transmitting fluid pressure of said deep ocean environment to the interior of said container; and insulating oil contained within said container effectively filling the voids between said circuit means and the interior walls of said container.

2. A submarine power package according to claim 1 in which said container is a rectangular metal enclosure.

3. A submarine power package according to claim 2 in which said circuit means further includes:
- a metallic heat sink supporting said pressure resistant semiconductor active elements;
- a circuit board mounting said diode protection circuit and the coupling inductor thereon attached in supportative relation to one side of said metallic heat sink; and
- a transformer mounting panel mounted on the other side of said heat sink and supporting said output transformer thereon.

4. A submarine power package according to claim 3 in which said output transformer is a toroid transformer.

5. A submarine power package according to claim 4 in which said diode protection circuit limits the voltages applied to the input of the semiconductor active elements.

6. A submarine power package according to claim 5 in which each of said pressure resistant semiconductor active elements includes a molded plastic encapsulating case.

7. A submarine power package according to claim 6 in which said molded plastic encapsulating case includes:
- a metallic base derived from a conventional semiconductor active element metal enclosure for supporting the active semiconductor element;
- a soft plastic mass encapsulating the active semiconductor element and joined to said metallic base; and
- a relatively harder plastic case formed in contact with said metallic base so as to be joined thereto and in contact with said soft plastic mass to provide an encapsulating case.

8. A submarine power package according to claim 1 in which said circuit means further includes:
- a metallic heat sink supporting aid pressure resistant semiconductor active elements;
- a circuit board mounting said diode protection circuit and the coupling inductor thereon attached in supportative relation to one side of said metallic heat sink; and
- a transformer mounting panel mounted on the other side of said heat sink and supporting said output transformer thereon.

9. A submarine power package according to claim 1 in which said output transformer is a toroid transformer.

10. A submarine power package according to claim 1 in which said diode protection circuit limits the voltages applied to the input of the semiconductor active elements.

11. A submarine power package according to claim 1 in which each of said pressure resistant semiconductor active elements includes a molded plastic encapsulating case.

12. A submarine power package according to claim 11 in which said molded plastic encapsulating case includes:
- a metallic base derived from a conventional semiconductor active element metal enclosure for supporting the active semiconductor element;
- a soft plastic mass encapsulating the active semiconductor element and joined to said metallic base member; and
- a relatively harder plastic case formed in contact with said metallic base so as to be joined thereto and in contact with said soft plastic mass to provide an encapsulating case.

* * * * *